US009833658B2

(12) United States Patent
Wiener et al.

(10) Patent No.: US 9,833,658 B2
(45) Date of Patent: Dec. 5, 2017

(54) TREADMILL POWER STATION

(71) Applicant: Thermogenesis Group, Inc., Bellevue, WA (US)

(72) Inventors: Ron Wiener, Mercer Island, WA (US); Andrew Rosenbaum, Mercer Island, WA (US)

(73) Assignee: Thermogenisis Group, Inc., Bellevue, WA (US)

( * ) Notice: Subject to any disclaimer, the term of this patent is extended or adjusted under 35 U.S.C. 154(b) by 0 days.

(21) Appl. No.: 14/851,122

(22) Filed: Sep. 11, 2015

(65) Prior Publication Data

US 2016/0074705 A1 Mar. 17, 2016

Related U.S. Application Data

(60) Provisional application No. 62/051,741, filed on Sep. 17, 2014.

(51) Int. Cl.
*A63B 24/00* (2006.01)
*A63B 22/02* (2006.01)
*A63B 22/00* (2006.01)
*A63B 71/06* (2006.01)
*H04M 1/725* (2006.01)

(52) U.S. Cl.
CPC ...... *A63B 22/0235* (2013.01); *A63B 22/0023* (2013.01); *A63B 2071/068* (2013.01); *A63B 2071/0677* (2013.01); *A63B 2220/17* (2013.01); *A63B 2220/20* (2013.01); *A63B 2220/30* (2013.01); *A63B 2220/40* (2013.01); *A63B 2220/58* (2013.01); *A63B 2225/20* (2013.01); *A63B 2225/305* (2013.01); *A63B 2225/50* (2013.01); *H04M 1/72522* (2013.01)

(58) Field of Classification Search
USPC ........................................................ 482/1–9
See application file for complete search history.

(56) References Cited

U.S. PATENT DOCUMENTS

| | | | | |
|---|---|---|---|---|
| 5,433,679 A | * | 7/1995 | Szymczak | A63B 22/02 184/15.3 |
| 5,476,430 A | * | 12/1995 | Lee | A63B 22/02 482/3 |
| 5,721,659 A | * | 2/1998 | Young | H02H 3/207 361/111 |
| 6,575,878 B1 | * | 6/2003 | Choy | A63B 22/0235 482/51 |
| 6,997,852 B2 | * | 2/2006 | Watterson | A63B 21/005 482/1 |
| 8,805,386 B2 | * | 8/2014 | Cho | H04L 45/46 370/329 |

(Continued)

*Primary Examiner* — Stephen R Crow
(74) *Attorney, Agent, or Firm* — Sheridan Ross P.C.; Scott Weitzel (57) ABSTRACT

A treadmill power station is connected between a treadmill and its power outlet. The treadmill power station contains a power consumption sensor that reads information about the usage of the treadmill by externally analyzing its power consumption pattern. Information that can be derived in this manner includes, but is not limited to, the user's speed, distance covered and step count, as well as the general power consumption trend for the treadmill itself. The power station may contain a relay to activate or deactivate power outlets on the power station.

20 Claims, 11 Drawing Sheets

(56) References Cited

U.S. PATENT DOCUMENTS

| | | | |
|---|---|---|---|
| 8,818,477 B2* | 8/2014 | Soller | A61B 5/14551 |
| | | | 600/317 |
| 8,836,577 B2* | 9/2014 | Honda | H04Q 9/00 |
| | | | 342/372 |
| 9,072,930 B2* | 7/2015 | Ashby | A63B 24/0087 |
| 9,219,358 B2* | 12/2015 | Elberbaum | H02G 3/18 |
| 9,335,740 B2* | 5/2016 | Umamoto | G04B 47/061 |
| 9,429,511 B1* | 8/2016 | Kannel | G01N 19/02 |
| 2008/0169910 A1* | 7/2008 | Greene | H02J 17/00 |
| | | | 340/10.34 |
| 2009/0228318 A1* | 9/2009 | Ara | G06Q 10/06398 |
| | | | 705/7.42 |
| 2010/0235120 A1* | 9/2010 | Vroege | G01R 22/063 |
| | | | 702/62 |
| 2015/0238817 A1* | 8/2015 | Watterson | G06F 19/3481 |
| | | | 482/8 |
| 2016/0359325 A1* | 12/2016 | Kawata | H02J 3/14 |

* cited by examiner

TREADMILL POWER STATION

BACKGROUND

Many treadmills employ current sensors internal to their motor controllers in order to improve the smoothness of the motor and/or belt. These sensors, however, are internal to the electrical system in the treadmill and do not interact with or monitor other, external, treadmills.

SUMMARY

The disclosed Treadmill Power Station is connected between a treadmill and its power outlet. The Treadmill Power Station contains a power consumption sensor that reads information about the usage of the treadmill by externally analyzing its power consumption pattern, much as a cardiologist would interpret an EKG strip. Information that can be derived in this manner includes, but is not limited to, the user's speed, distance covered and step count, as well as the general power consumption trend for the treadmill itself.

BRIEF DESCRIPTION OF THE DRAWINGS

FIG. 5 illustrates circuitry which may be present in or utilized by Treadmill Power Station. FIGS. 5, 6, and 7 are a schematic of a power monitor and are meant to be viewed together.

FIG. 6 illustrates circuitry which may be present in or utilized by Treadmill Power Station. FIGS. 5, 6, and 7 are a schematic of a power monitor and are meant to be viewed together.

FIG. 7 illustrates circuitry which may be present in or utilized by Treadmill Power Station. FIGS. 5, 6, and 7 are a schematic of a power monitor and are meant to be viewed together.

FIG. 8 illustrates circuitry which may be present in or utilized by Treadmill Power Station. FIGS. 8 and 9 are a schematic of a power relay and are meant to be viewed together.

FIG. 9 illustrates circuitry which may be present in or utilized by Treadmill Power Station. FIGS. 8 and 9 are a schematic of a power relay and are meant to be viewed together.

DETAILED DESCRIPTION

Figure 1:
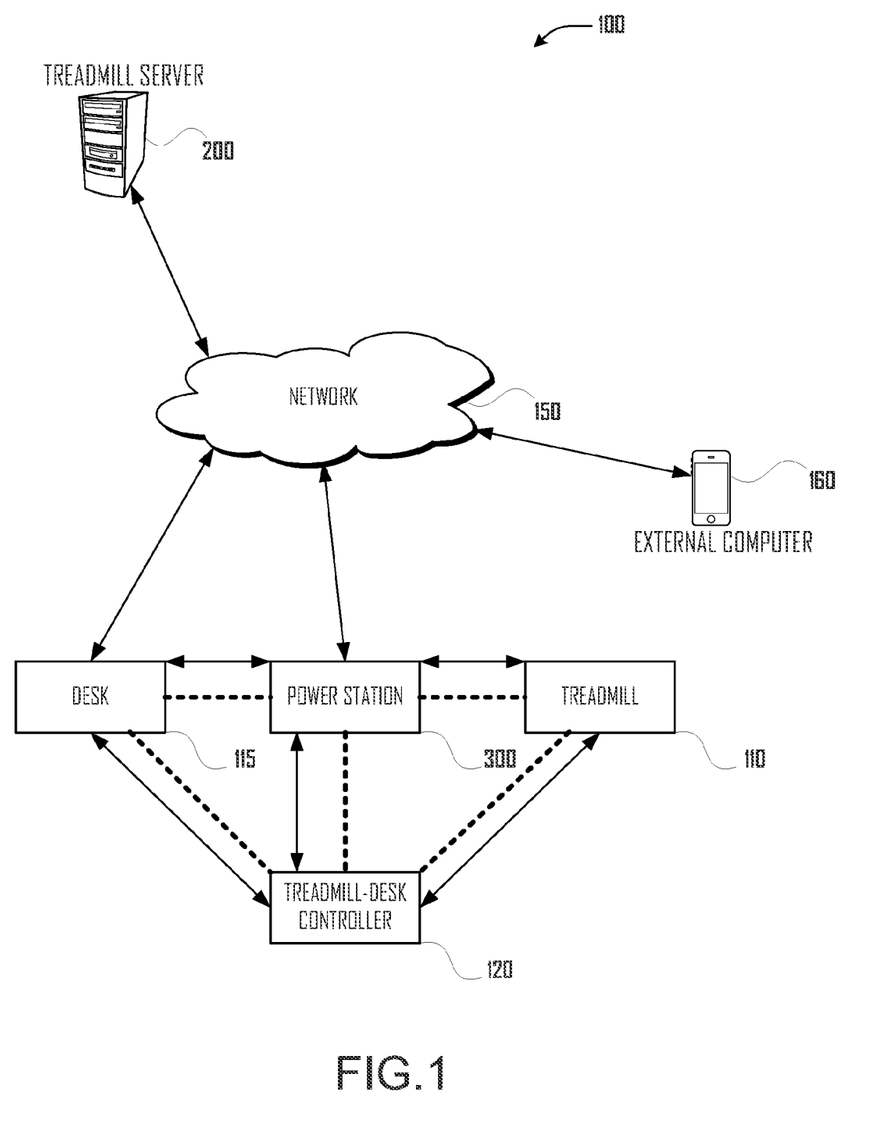
FIG. 1 is a network and device diagram illustrating an embodiment of a Treadmill Power Station, a Treadmill, a Treadmill-Desk Controller, a Desk, a Network, and a Treadmill Server.

In FIG. 1, dotted lines illustrate an electrical connection, while solid lines indicate a logical connection. In FIG. 1, logical and electrical connections may be routed through the Treadmill Power Station 300. In FIG. 1, both types of connections are shown between all of the devices, though in embodiments and/or use cases certain of the connections may not be present. For example, there may not be either logical or electrical connection between Treadmill-Desk Controller 120 and Treadmill 110 (or Desk 115), such as if Treadmill 110 (or Desk 115) is provided by a third party. In this example, Treadmill 110 may still connect to Treadmill Power Station 300 and Treadmill-Desk Controller 120 may view activity at Treadmill 110 via Treadmill Power Station 300.

In FIG. 1, Treadmill Power Station 300 is designed to take any treadmill and make it an "internet appliance" so that information about the treadmill user's performance, as well as the maintenance condition of the treadmill itself can be uploaded to remote computers, such as the Treadmill Server 200, and shared with various applications.

Treadmill Power Station 300 is connected between Treadmill 110 and its power outlet. Treadmill Power Station 300 contains a power consumption sensor that, in conjunction with Client-Side Power Consumption Monitor Routine 360, reads information about the usage of the treadmill by externally analyzing its power consumption pattern. Information that can be derived in this manner includes, but is not limited to, the user's speed, distance covered and step count, as well as the general power consumption trend for the treadmill itself. Embodiments of circuitry utilized by Treadmill Power Station 300 are illustrated in FIGS. 4-9.

Figure 5:
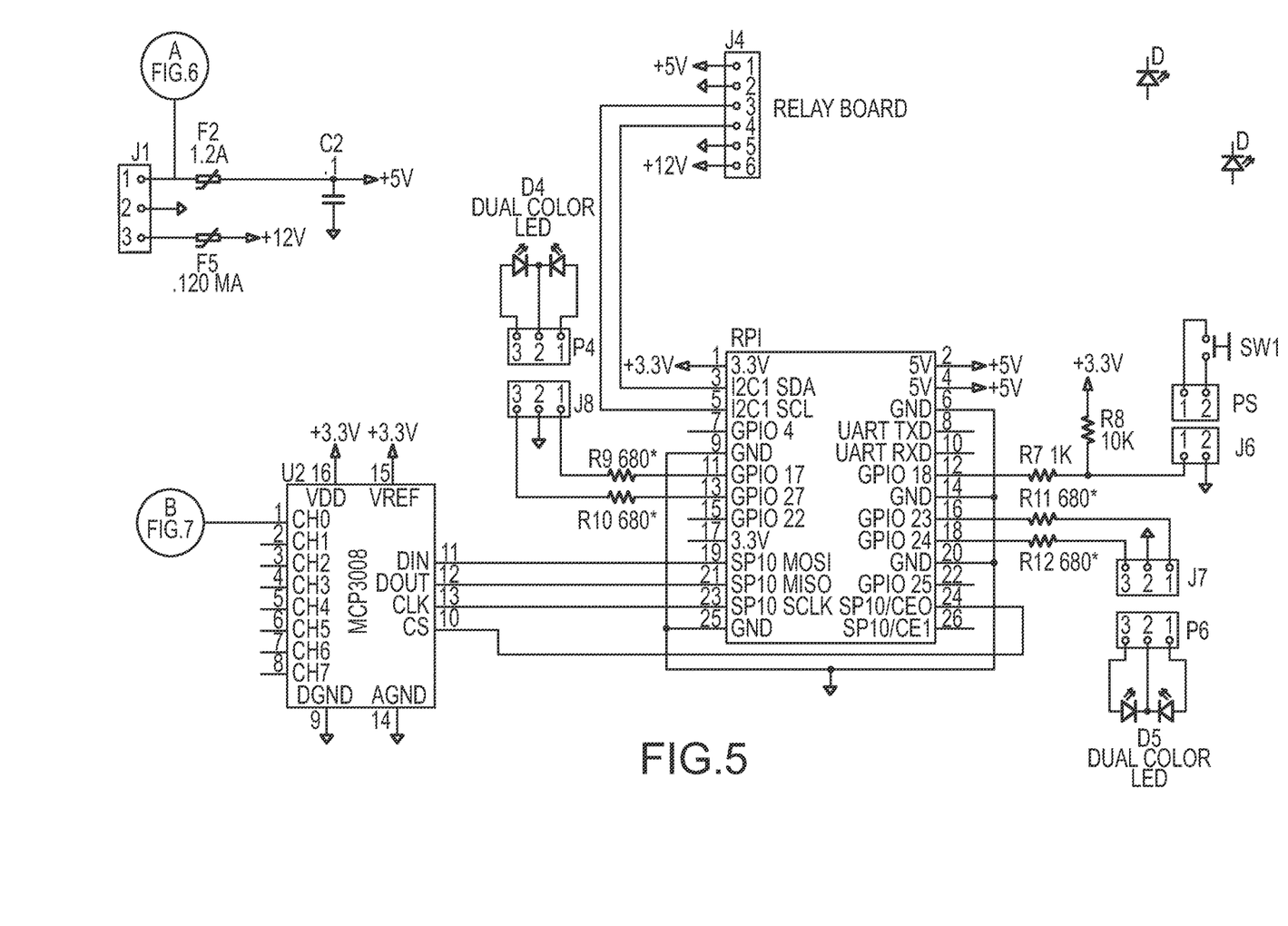
Figure 6:
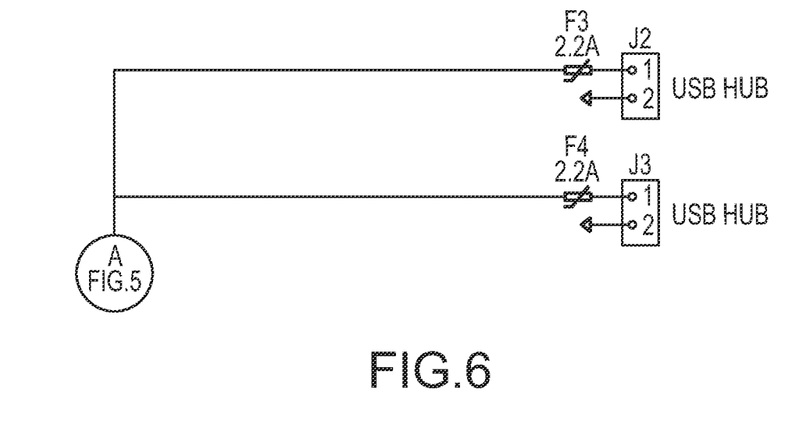
Figure 7:
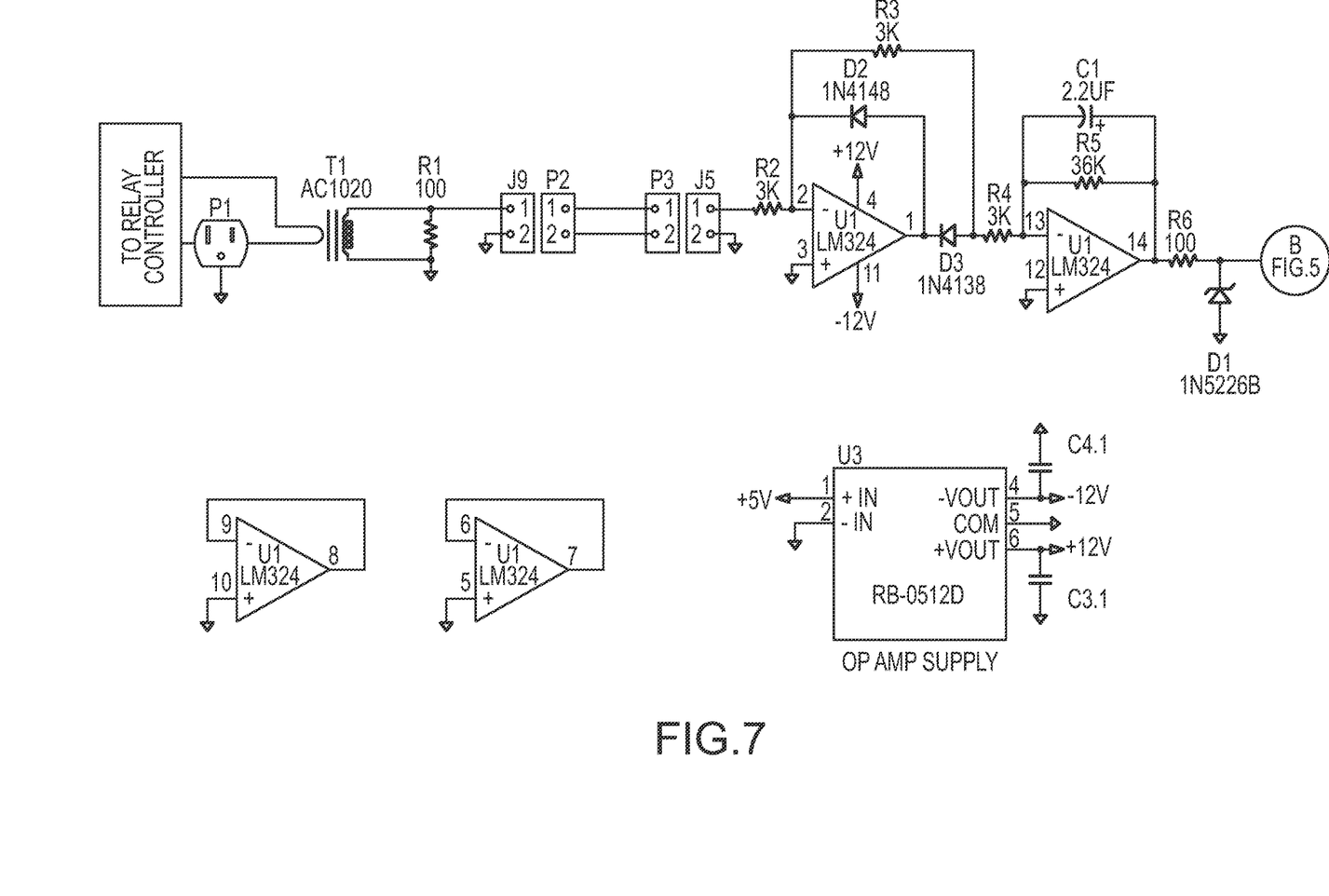

Treadmill Power Station 300 employs a current sensor external to the treadmill system. In being an external device with no need to interface directly to the control electronics in the treadmill, it can be used universally with any model of treadmill. The current sensor may be monitored by Client-Side Power Consumption Monitor Routine 360. An example of an embodiment of a current sensor is illustrated in FIGS. 5, 6, and 7.

Client-Side Power Consumption Monitor Routine 360 can provide a number of different services, including but not limited to:

Showing the user performance data such as accurate representation of time spent walking (leaving out pauses in which no user was on the belt), distance covered, calories burned, steps taken and other derivative data. Treadmills ordinarily record such information internally but the data can be inaccurate if the user stepped off the treadmill at any time without pausing the motor.

Showing the treadmill desk owner, operator, service provider and/or manufacturer the usage patterns of the equipment.

Triggering maintenance notifications when power consumption trends indicate a treadmill is in need of lubrication or repair. On treadmills equipped with an automatic lubrication system employing a reservoir of lubricant, notification signals can be sent directly to Treadmill 110 when high friction causes the power consumption level to exceed acceptable levels.

Electricity usage can be derived and retained for the purpose of understanding the economic and ecological impact of the activities on Treadmill 110.

Information from Client-Side Power Consumption Monitor Routine 360 can be uploaded to Server-Side Power Consumption Monitor Routine 260 to provide server-side services relating to power consumption.

Treadmill Power Station 300 connects via Wi-Fi, Ethernet port—or any other available method of connected to a network or the Internet—to a server, such as Treadmill Server 200, that is used to collect data from any number of treadmill desk workstations in the field. Users can also record preferences for desk and monitor height settings (for treadmill desk applications) and for preferred speed an incline settings for the treadmill.

Figure 8:
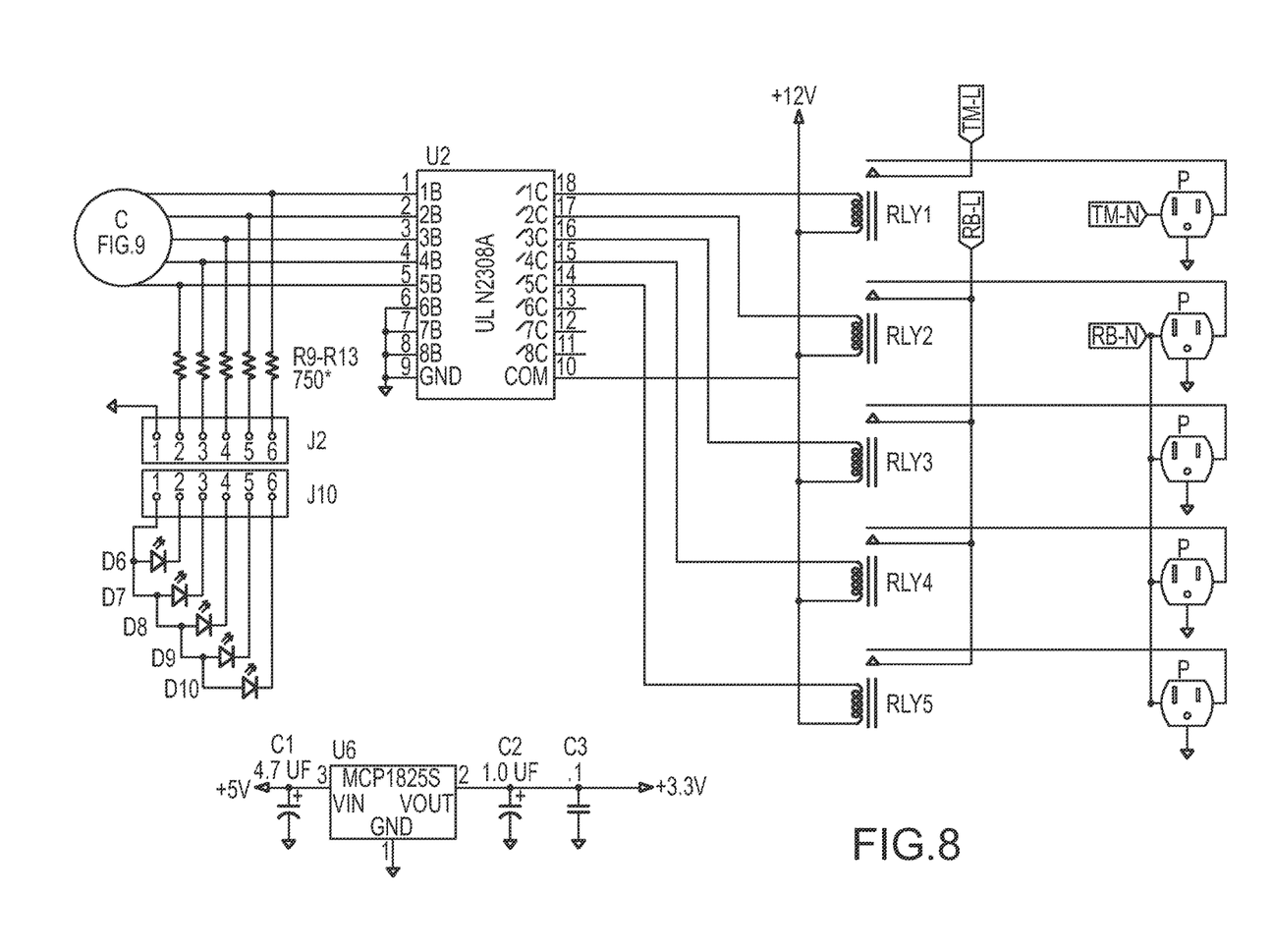
Figure 9:
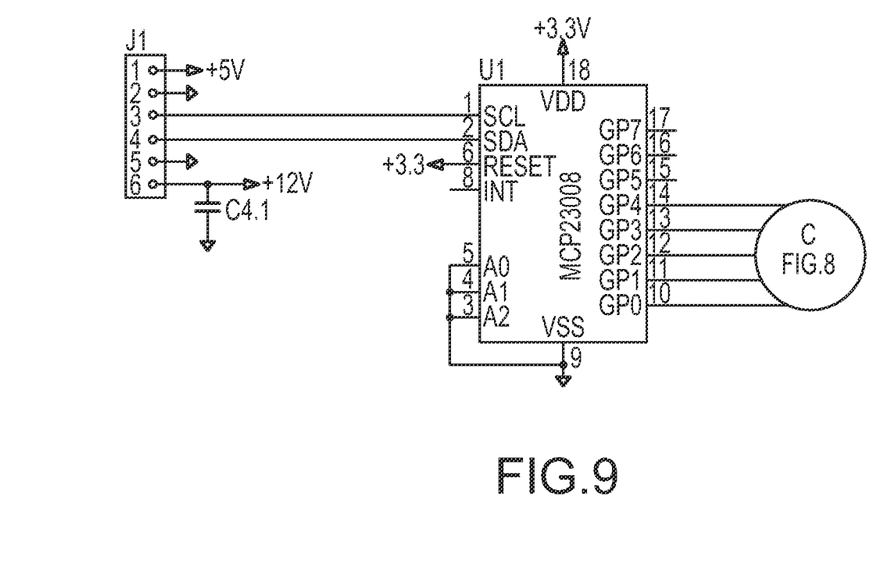

Treadmill Power Station 300 may also contain a web- or Internet-connected power switch controlled by Server-Side Remote Control Power Switch Routine 265 in Treadmill Power Station 200 and Client-Side Remote Control Power Switch Routine 365 in Treadmill Power Station 300 so that power to the treadmill can be remotely turned on or off by an application executed by, for example, External Computer 160. An example of an embodiment of such a relay is illustrated in FIGS. 8 and 9. For example, in a large organization or in the case of a publicly accessible treadmill or treadmill desk (e.g. library, airport lounge, hotel business center) the operator of the facility, or the employer, may want to limit use of the treadmill or treadmill desk only to individuals who have a) identified themselves, b) accepted a liability waiver, and/or c) have an account on the server for storing their personal performance information and equipment setting preferences. A login procedure would be followed through either the treadmill's controller, such as Treadmill-Desk Controller 120 (if electronically linked to Treadmill Power Station 300) or any web or smartphone application (as may be executed by External Computer 160). Once logged in and the liability waiver is acknowledged the treadmill power would be toggled on by Server-Side Remote Control Power Switch Routine 265 and Client-Side Remote Control Power Switch Routine 365. Facility operators and employers may also set certain limitations on the use of the equipment—such as allowable top speed—monitored and enforced by and through Treadmill Power Station 300 and applications that connect to it, such as via Treadmill Server 200.

Treadmill Power Station 300 derives information from the power consumption analysis performed by Client-Side Power Consumption Monitor Routine 360 by having a Performance Profile Table 370 stored in memory of the power consumed when a person weighing (x) pounds walks or runs at speed (y). A stored program will upon initialization and from time to time thereafter remind users to calibrate the system by performing a routine of walking at incrementally faster speeds, and recording their current body weight in the system. Power consumption profile models can be derived by aggregating multiple users' calibration profiles in Treadmill Server 200. Default profiles, such as Default Profile 270, for common treadmill models can also be downloaded to or included in the programming of Treadmill Power Station 300, based on tests of factory☐new units.

Figure 2:
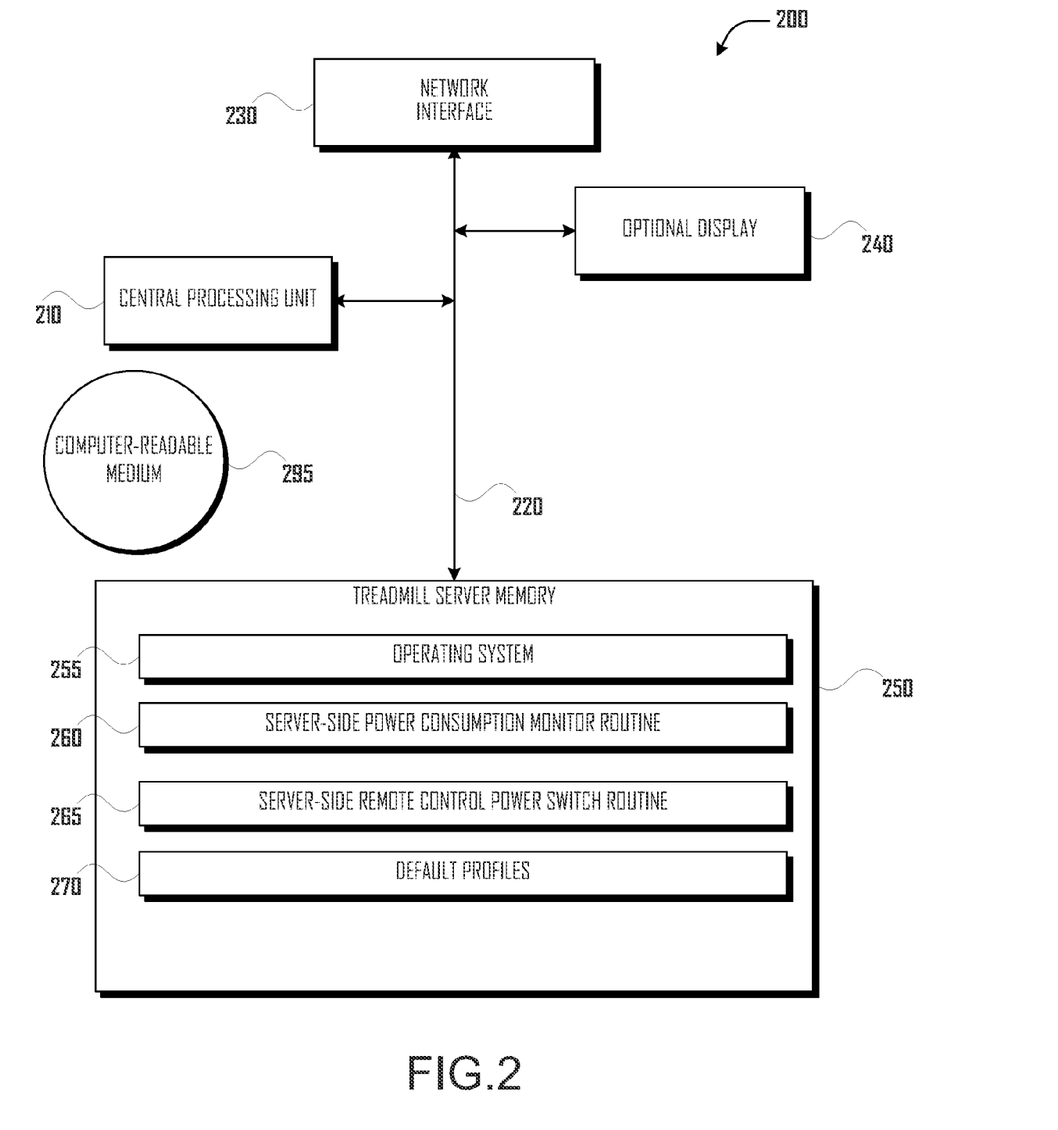
FIG. 2 illustrates an embodiment of a Treadmill Server computing device.

FIG. 2 is a functional block diagram of an exemplary Treadmill Server 200 computing device and some data structures and/or components thereof. The computing device 200 comprises at least one Processing Unit 210, Treadmill Server Memory 250, and an optional Display 240, all interconnected along with the Network Interface 230 via a Bus 220. The Network Interface 230 may be utilized to form connections with the Network 150 and to send and receive radio frequency ("RF") and other wireless and wireline signals.

Treadmill Server Memory 250 generally comprises a random access memory ("RAM"), a read only memory ("ROM"), and a permanent mass storage device, such as a disk drive or SDRAM (synchronous dynamic random-access memory). Treadmill Server Memory 250 stores program code for software routines, such as, for example, Server-Side Power Consumption Monitor Routine 260 and Server-Side Remote Control Power Switch Routine 265 as well as browser, webserver, email client and server routines, camera, other client applications, and database applications. In addition, Treadmill Server Memory 250 also stores Operating System 255. These software components may be loaded from a non-transient Computer Readable Storage Medium 295 into Treadmill Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supported input modalities, Input 245, such as, for example, a touchscreen, a keyboard, a mouse, a trackball, a stylus, a microphone, accelerometer(s), compass(es), RF receivers (to the extent not part of the Network Interface 230), and a camera, all in conjunction with corresponding routines.

Treadmill Server 200 may also comprise or communicate via Bus 220 with a datastore utilized by Treadmill Server 200. In various embodiments, Bus 220 may comprise a storage area network ("SAN"), a high speed serial bus, and/or via other suitable communication technology. In some embodiments, Treadmill Server 200 may communicate with the datastore via Network Interface 230. Treadmill Server 200 may, in some embodiments, include many more components than those shown in this Figure. However, it is not necessary that all of these (or other) generally conventional components be shown in order to disclose an illustrative embodiment.

Treadmill Server 200 is illustrated in FIG. 2 as comprising data groups for routines, such as routines for Server-Side Power Consumption Monitor Routine 260 and Server-Side Remote Control Power Switch Routine 265. Additional data groups for routines, such as for a webserver and web browser, may also be present on and executed by Treadmill Server 200. Webserver and browser routines may provide an interface for interacting with the other computing devices illustrated in FIG. 1 (all which may serve and respond to data and information in the form of webpages and html documents or files). The browsers and webservers are meant to illustrate user-interface and user☐interface enabling routines generally, and may be replaced by equivalent routines for serving and rendering information to and in a user interface in a computing device (whether in a web browser or in, for example, a mobile device application).

Figure 3:
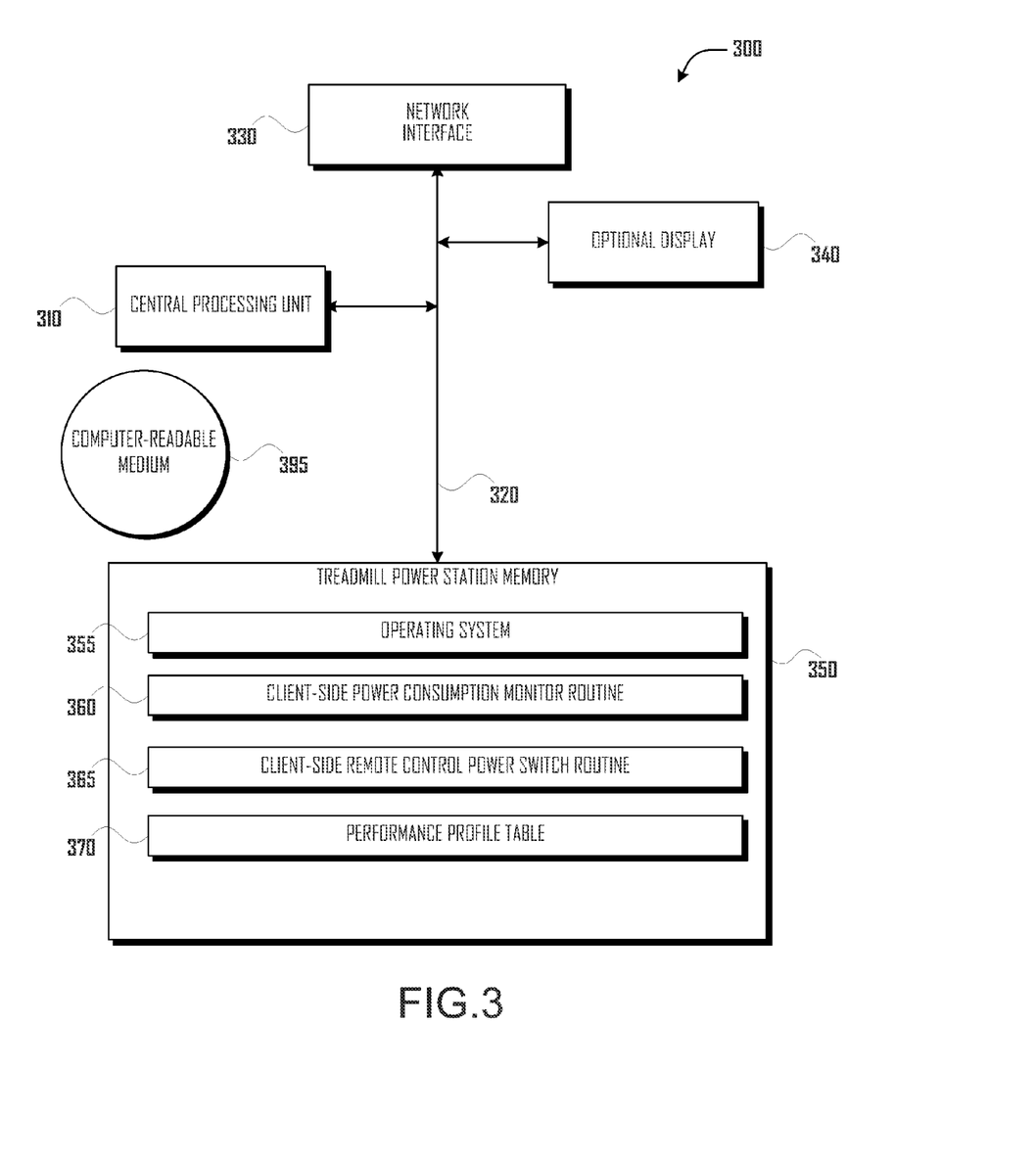
FIG. 3 illustrates an embodiment of a Treadmill Power Station computing device.
Figure 4:
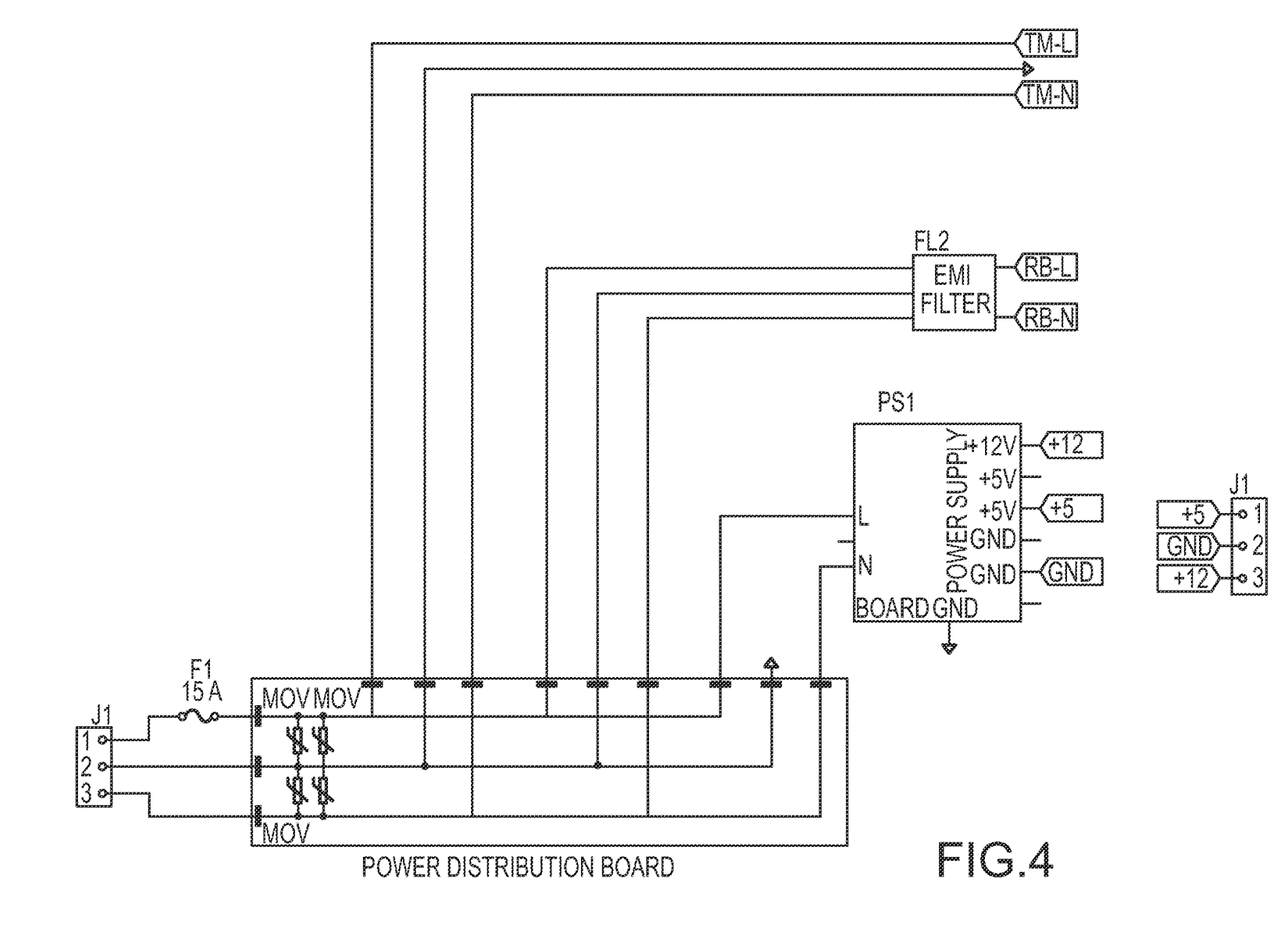
FIG. 4 illustrates circuitry which may be present in or utilized by Treadmill Power Station.

FIG. 3 is a functional block diagram of an exemplary Treadmill Power Station 300 computing device and some data structures and/or components thereof. The computing device 300 comprises at least one Processing Unit 310, Treadmill Power Station Memory 350, and an optional Display 340, all interconnected along with the Network Interface 330 via a Bus 320. Network Interface 330 may be utilized to form connections with the Network 150 and to send and receive radio frequency ("RF") and other wireless and wireline signals.

Treadmill Power Station Memory 350 generally comprises a random access memory ("RAM"), a read only memory ("ROM"), and a permanent mass storage device, such as a disk drive or SDRAM (synchronous dynamic random☐access memory). Treadmill Power Station Memory 350 stores program code for software routines, such as, for example, Client-Side Power Consumption Monitor Routine 360 and Client-Side Remote Control Power Switch Routine 365 as well as browser, webserver, email client and server routines, camera, other client applications, and database applications. In addition, Treadmill Power Station Memory 350 also stores Operating System 355. These software components may be loaded from a non-transient Computer Readable Storage Medium 395 into Treadmill Power Station Memory 350 of the computing device using a drive mechanism (not shown) associated with a non-transient Computer Readable Storage Medium 395, such as a floppy disc, tape, DVD/CD-ROM drive, memory card, or other like storage medium. In some embodiments, software components may also or instead be loaded via a mechanism other than a drive mechanism and Computer Readable Storage Medium 395 (e.g., via Network Interface 330).

The computing device 300 may also comprise hardware supported input modalities, Input 345, such as, for example, a touchscreen, a keyboard, a mouse, a trackball, a stylus, a microphone, accelerometer(s), compass(es), RF receivers (to the extent not part of the Network Interface 330), and a camera, all in conjunction with corresponding routines.

Treadmill Power Station 300 may also comprise or communicate via Bus 320 with a datastore utilized by Treadmill Power Station 300. In various embodiments, Bus 320 may comprise a storage area network ("SAN"), a high speed serial bus, and/or via other suitable communication technology. In some embodiments, Treadmill Power Station 300 may communicate with the datastore via Network Interface 330. Treadmill Power Station 300 may, in some embodiments, include many more components than those shown in this Figure. However, it is not necessary that all of these (or other) generally conventional components be shown in order to disclose an illustrative embodiment.

Treadmill Power Station 300 is illustrated in FIG. 3 as comprising data groups for routines, such as routines for Client-Side Power Consumption Monitor Routine 360 and Client-Side Remote Control Power Switch Routine 365. Additional data groups for routines, such as for a webserver and web browser, may also be present on and executed by Treadmill Power Station 300. Webserver and browser routines may provide an interface for interacting with the other computing devices illustrated in FIG. 1 (all which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

Figure 10:
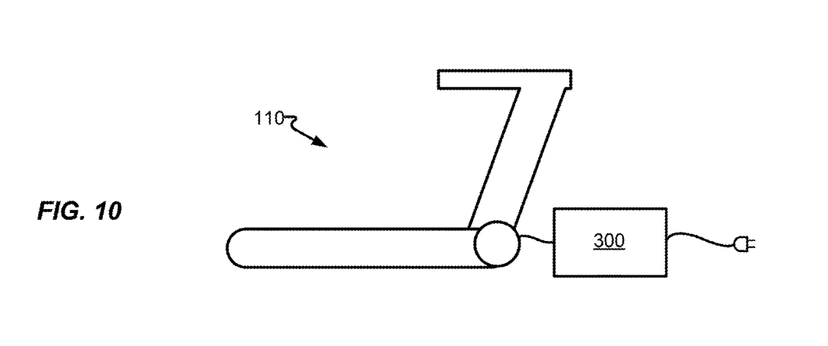
FIG. 10 illustrates a treadmill in accordance with embodiments of the present disclosure.

FIG. 10 illustrates treadmill 110 in accordance with embodiments of the present disclosure. Treadmill 110 utilizes electricity via a connection to a power source, such as a plug-in providing AC current. Treadmill 110, like many power load devices, utilizes electric power inconsistently. For example, a user on treadmill 110 may be walking or running on a belt controlled by a motor of treadmill 110 and cause belt to impart a periodic load to the motor, the period being associated with footfalls on the belt causing a brief spike in the load the user applied to the belt and, in turn, the belt applies to the motor.

In another embodiment, Treadmill Power Station 300 monitors the power consumed by treadmill 110. While treadmill 110 may comprise power load subcomponents (e.g., fans, LEDs, speakers, video displays, etc.), the draw on the power source is substantially consistent and minimal, when compared to that of the motor. Accordingly, Treadmill Power Station 300 may monitor, via a current sensor, the power consumed by Treadmill Power Station 300 which can be reflective of the user's footfalls on the belt of Treadmill Power Station 300.

In another embodiment, Treadmill Power Station 300 may be utilized or configured differently for a particular session. For example, Treadmill Power Station 300 may determine a greater overall electrical power consumption from one session as compared to another session. Such a difference may be attributable to different users (e.g., having different weight), different inclination of the belt, different friction/fault associated with the treadmill, different speed of the belt. A user may be known to Treadmill Power Station 300, such as via a login, or other configuration to determine or access a weight of a current user. While the speed of the belt may cause an increase in the power consumption observed by Treadmill Power Station 300, spikes in the power consumption may more accurately measure footfalls and the rate the user is moving on the belt. If a user is, or becomes, known to treadmill 110, the stride length may be determined or calculated, such as based on the user performing a calibration activity or based on a relationship between stride and the height of the user, which may be directly provided by the user. Accordingly, two spikes in the power consumption may mark two footfalls and, with the stride length known or determined, a distance traveled may then be determined. As a benefit, an unknown or otherwise unauthorized user of the full capacity of treadmill 110 may cause Treadmill Power Station 300 to restrict the power available to treadmill 110.

Figure 11A:
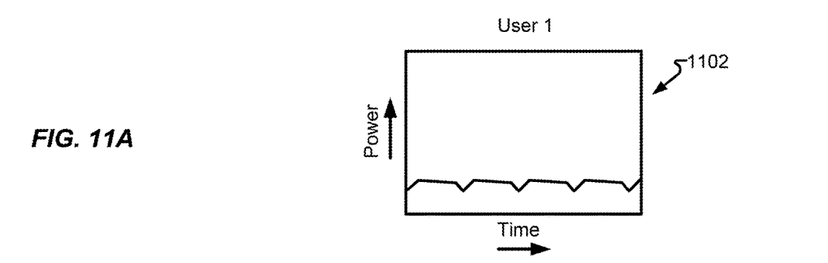
FIGS. 11A-11B illustrate power utilization pattern of a treadmill in accordance with embodiments of the present disclosure.
Figure 11B:
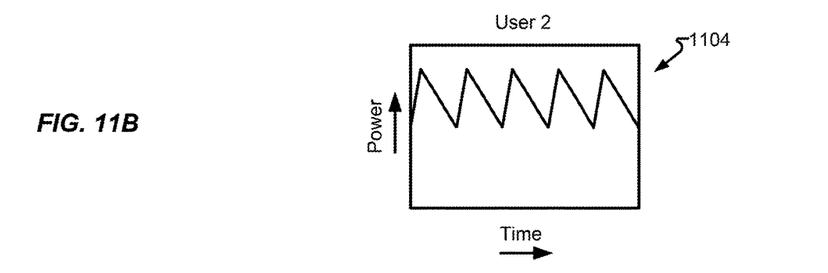

FIGS. 11A-11B illustrate power utilization pattern 1102, 1104, respectively, of treadmill 110 in accordance with embodiments of the present disclosure. In one embodiment, power utilization pattern 1102 may be associated with a particular user or exercise session of a particular user, exercising on treadmill 110. Power utilization pattern 1102 may be generally low, indicating a low overall power draw of the motor of treadmill 110, and have relatively low differences between peaks and troughs—such as to indicate a user having relatively low force footfalls. Accordingly, the user may be determined to be walking, having the belt portion relatively flat to the ground, and/or having a relatively low body weight.

In another embodiment, power utilization patter 1104 may be relatively high, indicating a greater power draw of the motor of treadmill 110. Accordingly, the user may be heavier, running, and/or utilizing the belt at an incline. Power utilization pattern 1102 and/or 1104 may have a certain number of peaks, associated with a motor load spike caused by a footfall, or valleys within a given time period, associated with a mid-stride position of the user. Counting peaks or valleys within a period of time allows strides and then, distances, calories, or other metrics to be derived.

Figure 12:
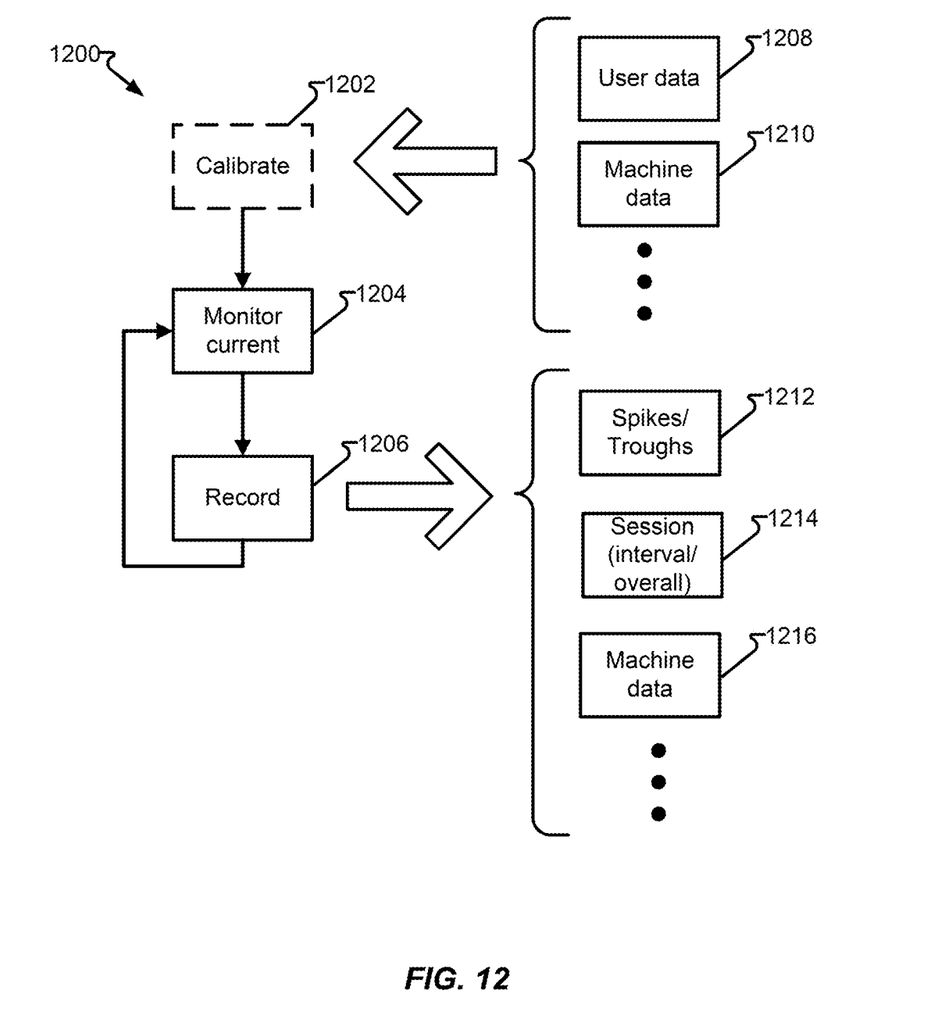
FIG. 12 illustrates a process in accordance with embodiments of the present disclosure.

FIG. 12 illustrates process 1200 in accordance with embodiments of the present disclosure. In one embodiment, optional calibration activates are performed at step 1202. Step 1202 may receive inputs, such as user data 1208 (e.g., height, weight, etc.) and machine data 1210 (e.g., prior utilization patters or aggregations thereof). Step 1204 monitors the current, such as by a current sensor of Treadmill Power Station 300 which is then recorded, such as in a memory, in step 1206. Process 1200 may then continue back to step 1204, or operate in parallel, until such time as the process 1200 is interrupted, such as by a user's session on treadmill 110 terminating.

In another embodiment, step 1206 may allow the resulting data to be utilized for a number of outputs including, but not limited to, spikes/troughs 1212, session overall (e.g., split interval or overall time, exertion, steps, distance, etc.).

The invention claimed is:

1. A power station, comprising: a power input for connecting the power station to a power source operable to provide electrical power; a power output for connecting the power station to a power load device to provide the power load device with the electrical power from the power source; the power load device comprises a treadmill;
a current sensor to sense the power consumption of the power load device; a processor to receive power consumption signals from current sensor and, in response to the received power consumption signals, determine a power consumption pattern of the power load device; wherein the processor, derives an exercise metric consistent with the human exerting a periodic load on the load device and the periodic load causing the power consumption pattern; and reporting the inferred exercise metric.

2. The power station of claim 1, wherein: the periodic variation of the power consumption signal is provided by variations in a mechanical load applied to a belt controlled by a motor of the treadmill.

3. The power station of claim 2, wherein the variations in the mechanical load applied to the motor comprises one or more of steps applied to the belt by a user of the treadmill, speed of the belt, inclination of the belt, or duration of use of the belt.

4. The power station of claim 2, wherein the processor causes the treadmill to prompt a user of the treadmill to perform a previously determined action such that the processor may observe the effect of the previously determined action upon the periodic variation of the power consumption signal and perform a calibration action in accordance therewith.

5. The power station of claim 2, wherein the processor limits an operation of the treadmill in accordance with an attribute of the user.

6. The power station of claim 1, further comprising:
a datastore comprising a user-specific constant; and
wherein the exercise metric further comprises a normalized exercise metric in accordance with the user-specific constant.

7. The power station of claim 6, wherein the user-specific constant comprises at least one of the height or the weight of a user of the treadmill.

8. The power station of claim 1, further comprising:
the processor further determining the power consumption signals comprise a degradation signal; and
the processor outputs a signal soliciting a maintenance activity for the power load device.

9. The power station of claim 8, further comprising:
an automatic lubrication system comprising lubricant in a lubricant reservoir; and
upon receiving the signal soliciting a maintenance activity for the power load device, the automatic lubrication system applies lubricant to a portion of the power load device.

10. The power station of claim 1, wherein the power consumption pattern is determined, at least in part, by a periodic variation of the power consumption signal.

11. The power station of claim 1, wherein the power consumption pattern is determined, at least in part, by a rate of a periodic variation of the power consumption signal.

12. A treadmill power and monitoring station comprising:
a power outlet;
a current sensor circuit adapted to monitor current through the power outlet to a treadmill;
an analog to digital circuit that receives an output of the current sensor and output to a controller a signal;
a relay control circuit adapted to control a relay that switches power to the power outlet on and off; and
a controller adapted to analyze the monitored current to determine one or more of a user's speed or a distance covered by the user and step count of the user.

13. The treadmill power and monitoring station of claim 12, further comprising an output component to output the one or more of the user's speed or the distance covered by the user and step count of the user.

14. The treadmill power and monitoring station of claim 12, wherein the controller is further adapted to analyze the monitored current to determine a maintenance requirement of the treadmill and outputting indicia of the maintenance requirement.

15. The treadmill power and monitoring station of claim 12, wherein the controller is adapted to selectively limit an operational attribute of the treadmill in accordance with a permission associated with a user of the treadmill.

16. A system, comprising:
means for connecting a power station to a power source to provide electrical power to the power station;
means for connecting a treadmill to the power station to provide the treadmill with the electrical power from the power source;
means for sensing the power consumption of the power load device;
means for receiving a power consumption signals from current sensor and, in response to the received power consumption signals,
means for determining a power consumption pattern of the power load device consistent with the human exerting a periodic load on the load device and the periodic load causing the power consumption pattern; and
means for outputting an inferred exercise metric from the determined power consumption pattern.

17. The system of claim 16, wherein the variations in the periodic load are determined by variations in a mechanical load applied to a motor of the treadmill and comprising one or more of steps applied to the belt by a user of the treadmill, speed of the belt, or stride length of a user.

18. The system of claim 16, further comprising, means to limit an operation of the treadmill in accordance with an attribute of a user of the treadmill.

19. The system of claim 18, further comprising, means to receive indicia of the user.

20. The system of claim 16, further comprising means for analyzing the monitored current to determine a maintenance requirement of the treadmill and means to output the maintenance requirement.

* * * * *